July 21, 1953     P. DESTOUMIEUX ET AL     2,646,296
PACKING FOR USE BETWEEN ROTATABLE AND FIXED PARTS
Filed Feb. 18, 1949

INVENTORS
PAUL DESTOUMIEUX &
MAXIME AMIRAULT,
BY Wenderoth, Lind & Ponack
ATTORNEYS Patented July 21, 1953

2,646,296

UNITED STATES PATENT OFFICE 2,646,296

PACKING FOR USE BETWEEN ROTATABLE AND FIXED PARTS

Paul Destoumieux, Neuilly-sur-Seine, and Maxime Amirault, Anthony, France

Application February 18, 1949, Serial No. 77,236
In France June 14, 1944

1 Claim. (Cl. 286—11)

This invention aims at improving such packings as are to be interposed between a rotatable and a fixed part.

As substitutes for the old-fashioned packing glands for making a pump barrel or a hub stanch at the point of emergency of the shaft, devices are already in general use which consist of a ring partaking of the rotation of the shaft on which same is tightly fitted, generally through the medium of a rubber membrane, and which is laterally in frictional engagement with the inner or the outer wall of the hub or pump barrel. Generally, such arrangements work successfully as far as tightness is concerned, but from the practical point of view they possess some defects, namely: on one hand they have large diameters or lengths depending on their design, which makes it difficult to accommodate them; on the other hand, the various parts composing them can be assembled only in the course of their fitting upon the shaft itself, which makes it an uneasy and delicate task to manipulate and fit them.

The packing seal providing the subject-matter of this invention is designed with a view to avoid these inconveniences. Its essential features are on one hand that the spring is arranged between the friction ring and the elastic sleeve both circumferentially rigid with the shaft, or between rings rigid with the said members, for the sake of compactness, on the other hand, a central metal ring is specially arranged which surrounds the central portion of the rubber membrane so that the same is firmly pressed against the shaft in order to provide for the desired tightness and to cause the packing to be carried with by the shaft, and which is formed with a flange or collar intended to hold the spring preparatorily to the fitting of the packing.

More features of this invention will be pointed out in the following description of various embodiments of the same which are given by way of example hereinafter, reference being had to the appended drawing in which.

Figure 1:
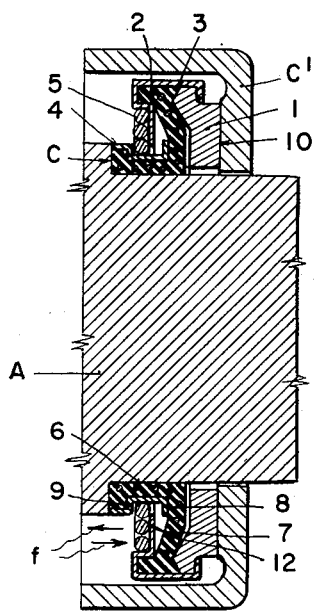
Figure 1 is a cross-sectional view of a packing fitted in a hub.

The packing seal shown in Fig. 1 is composed of a friction ring 1 made of a special material such as carbon, or of metal, preferably one having a low friction-factor, an elastic sleeve 2 made of rubber or like plastic material, a clamping ring 3 which is made rigid with friction ring 1 and elastic sleeve 2 by clamping the same at their outer edges, an inner ring 4 surrounding the inner flange 6 of the elastic sleeve 2 and a slightly tapered spiral spring 5 compressed in the axial direction between the clamping ring 3 and inner ring 4 to urge the latter apart from each other as indicated by the arrows $f$. In the free state, prior to their being mounted on shaft A, the various parts of the packing device are arranged as described and form a one-piece aggregate since on one hand friction ring 1 and an elastic sleeve 2 are secured to each other by clamping ring 3 and, on the other hand, spring 5 is held in position by the flange 9 formed by inner ring 4 which in turn is held, on one hand, upon the flange 6 of the elastic sleeve 2 by the said flange 9 and, on the other hand, by the inner flange 7 of clamping ring 3 engaged by the flange 8.

When fitted as shown in Fig. 1 the device is located concentrically with the shaft A and operatively connected therewith by the bearing force of the inner flange 6 of the elastic sleeve 2 which has a driving fit on said shaft and is permanently pressed upon the same by inner ring 4. In the axial direction, the edges of the inner ring 4 and of the inner flange 6 of elastic sleeve 2 abut against a shoulder C on shaft A, while spring 5 backed on the shoulder 9 formed by the inner ring 4 presses the friction ring 1 against the upstanding inner face 10 of the housing $C^1$.

The operation is as follows: the packing seal partakes of the rotary movement of the shaft A and the friction ring 1 remains in permanent frictional engagement with face 10 of housing $C^1$, so that tightness of the joint between the housing and the shaft prevails as soon as the surfaces come into contact with each other. At rest the friction ring 1 remains in contact with the housing C and fluid tightness is thus maintained. Such wear as can arise in operation from the friction between the contacting surfaces is taken up by the axial displacement of the friction ring 1, which is effected most easily by the thrust from spring 5 on account of the yielding of the elastic sleeve 2 in the direction considered.

Figure 2:
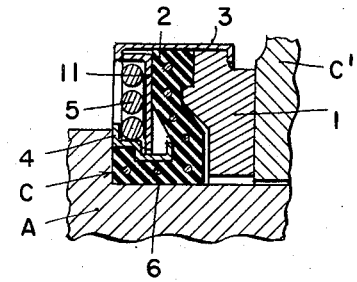
Figures 2 to 5 are half cross-sectional views showing modifications.
Figure 3:
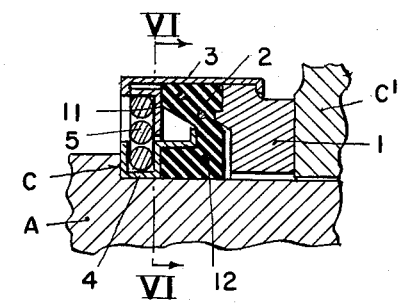
Figure 4:
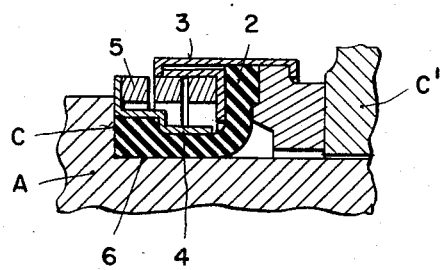
Figure 5:
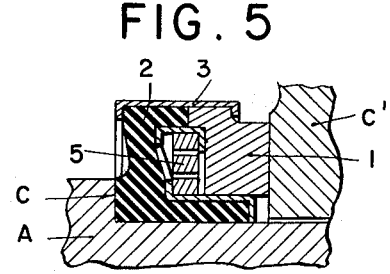

The packing illustrated in Fig. 2 comprises one part more than the one just described, namely, the distance-ring 11; the same enables the construction to become more compact and at the same time simplifies the shape of all the metal parts which thus can be manufactured more easily; Fig. 3 shows a packing constructed with a view further to reduce the diametrical dimensions; for that purpose, the flange 6 of elastic sleeve 2 is curtailed considerably and vulcanized within the inner ring 4 so as to exclude separation; in the embodiment shown in Fig. 4, a cylindrical coil spring is used which makes the packing somewhat bulky in the axial direction but extremely compact in its diameter; in another embodiment illustrated in Fig. 5, the spring 5 is located between the friction ring 1 and the elastic sleeve 2, whereby in particular application, e. g. within a pump, it becomes possible to remove the spring from any contact with the liquid and consequently to keep it safe from an oxidation by the same.

In another embodiment (not shown), the friction ring can be used as the clamping ring or the distance ring, which is connected with no difficulty where the ring is metallic.

Figure 6:
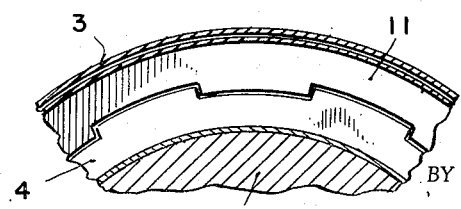
Figure 6 illustrates details of the invention in cross-sectional view taken on line VI—VI in Fig. 3.

Besides, in order to avoid the elastic sleeve having to transmit the whole of the resistant moment from the friction ring, which moment can be very considerable where a high pressure is imposed upon the device, this invention contemplates the clamping ring, or the distance ring attached thereto (or even the friction ring depending on the embodiment considered) being made rotationally rigid with the ring surrounding the flange of the elastic sleeve, the distance ring being attached to the clamping ring and secured to the friction ring by means of an interlocking annular joint formed between the alternating annular projecting portions of the outer distance ring and the corresponding registering intermating annular projecting portions of the clamping ring thus forming the joint between the two parts concerned, e. g. as shown in Fig. 6. This invention also contemplates the strengthening of the elastic sleeve by a textile or metal insert 12 whereby said elastic sleeve, although retaining its flexibility in the axial direction, becomes considerably more resistant in the circumferential direction. The invention also contemplates moulding the elastic sleeve upon the spring.

Besides it is to be understood that the shape of the parts described can be altered considerably without departing from the scope of the invention; it is also possible e. g. to provide the clamping ring with peripheral driving members by using leaf springs, to secure the frictional ring to the elastic sleeve by cramping, vulcanizing or any other suitable means, to make the inner flange of the elastic sleeve circumferentially fast with the friction ring through a latch guided in a slot in said flange and received in a bore in the ring or by any other suitable means, etc.

What we claim is:

A packing seal to be interposed in fluid-tight relationship between a rotary shaft and a fixed casing having a radial surface at about right angles to an axis surface and surrounding said shaft, comprising an elastic sleeve about the shaft within the casing which is provided with a radially projecting portion extending outwardly from said shaft and an axially extending portion surrounding said shaft at about a right angle to said radially projecting portion, said axially projecting portion having a raised shoulder at its end opposite the radially projecting portion, a friction ring within said casing laterally abutting the upper radially projecting portion of said sleeve and the inner radially projecting surface of said casing, a clamping ring between the inner axial surface of said casing and the upper radial portions of said friction ring and said sleeve, said clamping ring provided with return bend portions to secure said sleeve and said friction ring at the top and at opposing sides of said sleeve and ring in fluid-tight relationship to permit the assembly to slide on said shaft, said friction ring cut back at its upper radial and upper axial surfaces to form a recess which permits the interfitting engagement of the clamping ring and friction ring, said clamping ring having a holding portion projecting radially towards said shaft and terminating adjacent the inner edge of said shoulder, an inner ring fitting radially below said clamping ring and enclosing said shoulder, a conical spiral spring disposed radially towards said shaft held between said clamping ring and said terminating end of said inner ring and said shoulder, said spring pressing said friction ring in fluid-tight engagement with the inner radial surface of said casing and an annular concentric distance ring secured to said clamping ring between said return bend portion and said shaft which rotates with said clamping ring, said clamping ring connected to said assembling ring by means of an interlocking annular joint.

PAUL DESTOUMIEUX.
MAXIME AMIRAULT.

References Cited in the file of this patent

UNITED STATES PATENTS

| Number | Name | Date |
|--------|------|------|
| 2,365,351 | Matter | Dec. 19, 1944 |
| 2,461,907 | Magnesen | Feb. 15, 1949 |
| 2,463,695 | Jensen | Mar. 8, 1949 |
| 2,467,543 | Voytech | Apr. 19, 1949 |
| 2,472,257 | Matter | June 7, 1949 |